Sept. 8, 1925
W. G. SCHOENKE
SUNSHADE AND GLARESHIELD
Filed Dec. 17, 1924
1,552,764
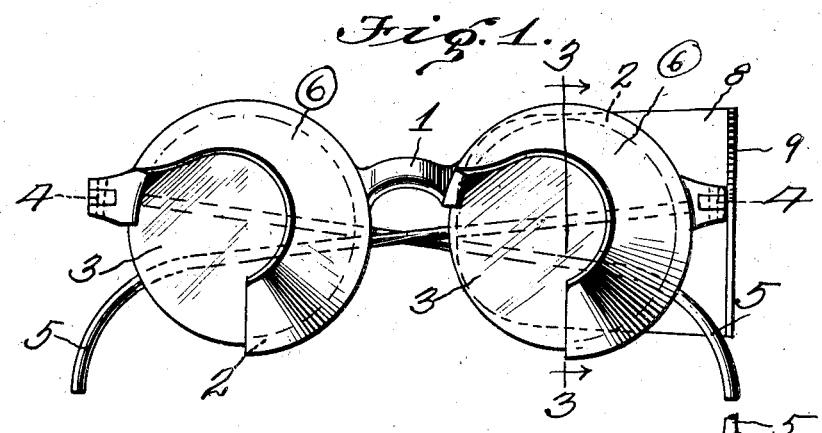
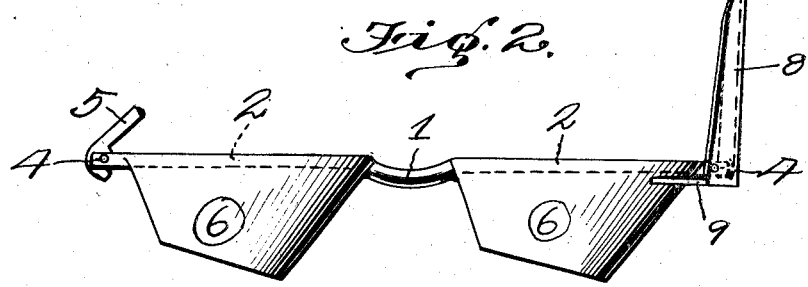
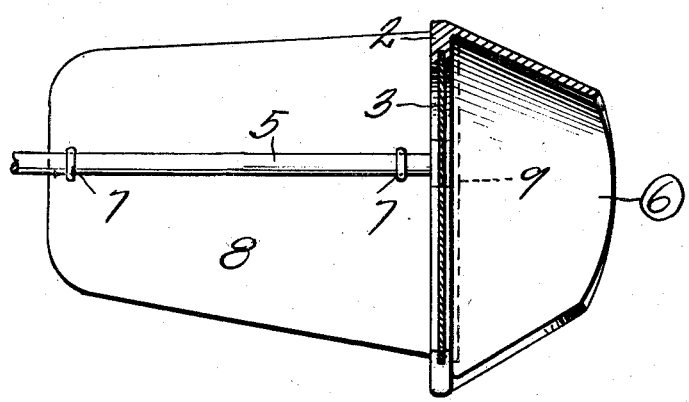
Inventor
W. G. Schoenke
By D. Swift
Attorney Patented Sept. 8, 1925.

1,552,764

UNITED STATES PATENT OFFICE.

WILLIAM G. SCHOENKE, OF HARTFORD, WISCONSIN.

SUNSHADE AND GLARESHIELD.

Application filed December 17, 1924. Serial No. 756,468.

*To all whom it may concern:*

Be it known that I, WILLIAM G. SCHOENKE, a citizen of the United States, residing at Hartford, in the county of Washington, State of Wisconsin, have invented a new and useful Sunshade and Glareshield; and I do hereby declare the following to be a full, clear, and exact description of the invention, such as will enable others skilled in the art to which it appertains to make and use the same.

The invention relates to sun shades and glare shields, and has for its object to provide a device of this character formed integral with semicircular shaped rims of eye glasses, which eye glasses may be provided with lenses if desired, and the shields extending around the upper sides of the rims of the glasses, and downwardly on the left sides of the rims and along the bottoms of the semicircular rims, said shields tapering towards the axis of the rims and form means whereby an automobilist will not become blinded by light, for instance the sun, when near the horizon, or by the headlights of approaching vehicles, and which shields will cut off the light rays from the eyes of the operator of the automobile.

A further object is to form the shields from a transparent material, preferably colored for breaking up the light rays and neutralizing the same.

A further object is to provide the left temple member with a shield which will protect the eyes against the rays of light from automobiles as they pass the automobile of the wearer of the device. Also to provide a temple shield right angularly shaped with one of its members secured to the temple piece and its other arm recessed for the reception of the outer side of the left shield.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a front elevation of the device.

Figure 2 is a top plan view of the device showing the left temple member in operative position.

Figure 3 is a vertical transverse sectional view taken on line 3—3 of Figure 1.

Referring to the drawing, the numeral 1 designates a conventional form of nose bridge, which nose bridge has formed integral therewith semicircular rims 2, in which if desired lenses 3 may be placed, however the device may be used over conventional form of glasses without the lenses 3. Hingedly connected at 4 to the outer sides of the rims 2 are temple members 5 adapted to extend rearwardly over the temples and hook over the ears in the usual manner.

It has been found that operators of automobiles are blinded by the rays from the sun, especially when headed towards the sun, and the sun is low, or approaching the horizon, also that they are blinded by the rays from headlights of approaching vehicles at night. To obviate this difficulty the semicircular rims 2 are provided with shields 6, which shields are formed integral with the semicircular rims 2 and extend around the upper left and lower portions of the rims as clearly shown in Figure 1, and said shields taper towards the axis of the rims, therefore it will be seen that when an operator, wearing the device, is approaching a vehicle going in the opposite direction, by a very slight turning of the head to the right, the rays from the headlights approaching may be cut out or modified by engagement with the shields 6, which are formed from a transparent or translucent material, preferably colored, for instance green. It will also be seen that the sun rays may be eliminated in the same manner, and the operator's vision ahead will be unobstructed except by the shield through which he may see, but with the light rays dimmed by the shield, and when the head of the operator is moved slightly to the right upon the approach of lights, which are too bright for eye comfort, and at which time the shield takes the glare.

Lenses 3 have been shown in the rims for purposes of illustration, and the device may be made in this form where operators desire their own special lenses, instead of using the device over their own glasses, however the device may be used over ordinary glasses and where desired by person who do not wear glasses of any kind, the device is preferably used without lenses in the rims 2.

To prevent being blinded as the operator is passing lights of other vehicles, the left temple piece 5 has secured thereto as at 7 a shield 8, which is formed from semitransparent colored material, and which shield prevents light rays from striking the operator's eyes behind the frames 2 when passing another vehicle as set forth above. The forward end of the shield 8 is provided with a right angularly disposed portion 9, which portion engages the outer periphery of one of the shields 6 and additionally prevents light rays from passing behind the shield 6 or the shield 8.

The invention having been set forth what is claimed as new and useful is:—

The combination with the rims of eyeglasses, of glare protector shields formed integral with said rims, said shields being formed from translucent material and extending around the upper, left and under side of the rims, said shield tapering outwardly towards the axis of the rims, a temple member hingedly connected to the outer side of one of the rims, a glare shield engaging the outer side of the temple member, said glare shield extending forwardly to a position forwardly of the rim, an angularly disposed member carried by the glare shield, said angularly disposed member engaging the outer side of the glare protector shield forwardly of the rim.

In testimony whereof I have signed my name to this specification.

WILLIAM G. SCHOENKE.